Patented Mar. 18, 1930

1,751,377

UNITED STATES PATENT OFFICE

PHILIP G. WRIGHTSMAN, OF CHESTER, PENNSYLVANIA, ASSIGNOR TO E. I. DU PONT DE NEMOURS & COMPANY, OF WILMINGTON, DELAWARE, A CORPORATION OF DELAWARE

NITRATED CARBOHYDRATE EXPLOSIVE AND METHOD OF PRODUCING THE SAME

No Drawing.  Application filed November 7, 1927.  Serial No. 231,779.

My invention relates particularly to explosives obtained by nitrating mixtures of carbohydrates with chlorine derivatives of polyhydric alcohols and has for its object the production of liquid explosives possessing satisfactory properties for use in dynamites and containing higher proportions of carbohydrates than it has been practical to use heretofore.

Solutions of sugars in glycerin or in mixtures of glycerin with other polyhydric alcohols have been widely used in the manufacture of liquid explosive dynamite ingredients. Solutions of carbohydrate in monochlorhydrin are claimed in U. S. Patent Nos. 1,463,980 and 1,473,685 granted to Sturgis in 1923. The use of sugar possesses, on the one hand, the advantages of lowering the cost and depressing the freezing point of the nitrated product and, on the other hand, the disadvantages of lowering the stability and increasing the viscosity of the nitrated product, thereby making it more difficult to wash free of acid and settle to a low moisture content. In practice, a solution of about 20% sugar has been most extensively used. While efforts have been made to introduce other carbohydrates in place of sucrose, this carbohydrate in the form of cane or beet sugar is by far the most satisfactory, considering price, purity, supply, stability, yield, explosive properties, etc.

In the case of sucrose it has not been practical to use more than 20% sugar without special equipment. Even with special apparatus and the observance of special precautions 25% sugar solution seems to be the practical maximum (U. S. Patent No. 1,478,588, granted to Ernest M. Symmes, December 25, 1923).

The factors which have limited the proportion of sugar in the past are as follows:

1. With glycerin or glycerin-diglycerin mixtures the use of more than 20% sucrose, either dissolved or suspended, gives a nitrated oil of such high viscosity that it is impractical without special equipment and process to purify, stabilize, and settle to low moisture content.

2. With glycerin-diglycerin mixtures the use of more than 20% surcrose either dissolved or suspended gives a nitrated product of undesirably low sensitiveness.

3. With glycerin, diglycerin, ethylene glycol, chlorhydrins, or mixtures of these, the solubility of sucrose is so low that the dissolution of more than 25% cannot be accomplished without great danger of scorching the solution, and the solution, if prepared, does not stand a practical length of time without crystallization taking place.

The composition of a saturated solution of cane sugar in glycerin, ethylene glycol, chlorhydrins, or mixtures of these at normal room temperature, for example, 70° F., is about 8% to 10% sugar, although supersaturated solutions containing 20% to 25% sucrose will stand at room temperature considerable time before crystallizing. The preparation of a solution of more than 25% sucrose in glycerin, diglycerin, ethylene glycol or chlorhydrins seems impractical because the higher temperature required scorches the solution. The use of over 25% solution seems impractical because of the relatively rapid rate of crystallization at room temperature and because scorching takes place if the solution is stored above the temperature of the saturation point. Scorched solutions cause separation and washing troubles in preparing the nitrated product.

The introduction of chlorhydrins, particularly those having two or three carbon atoms, in glycerin-sugar mixtures gives a nitrated product of lower viscosity, which is more readily purified and which produces dynamites of increased sensitiveness. Therefore, in the presence of nitrated chlorhydrins, larger proportions of nitrated sugars may be satisfactorily used.

Others have mentioned the use of suspensions of sugar in glycerin, but none have mentioned a commercially practical and economical composition containing more than 25% sugar. British Patent No. 17,221, granted to Cocking in 1911, states that finely divided sugar can be nitrated in suspension in glycerin but he limits himself to a maximum of 20% to 25% sugar due to the high viscosity of the nitrated product.

I have discovered that by suspending carbohydrates in a chlorhydrin, or mixtures of polyhydric alcohols with chlorhydrins, having a lower viscosity than glycerin, there may be produced explosive oils having satisfactory properties for use in commercial explosive compositions and which contain larger proportions of nitrated carbohydrates than it has been practical to use heretofore.

I have further discovered that, by properly controlling the temperature of nitration of any given percentage of suspended carbohydrates, I can use carbohyrate particles of larger size than has previously been feasible. Furthermore, I have found that by properly controlling the temperature of nitration I can use a greater proportion of a given size carbohydrate particles than it is otherwise practical to employ.

Under proper conditions, 40% to 50% of suspended or partially dissolved and partially suspended sucrose in 60% to 50% chlorhydrin or mixtures of chlorhydrin with polyhydric alcohols can be satisfactorily nitrated, purified, stabilized and used in dynamites. The higher the percentage of sucrose the greater the proportion of chlorhydrin which is necessary in order that the explosive oil be entirely satisfactory. The higher the percentage of sucrose and the lower the temperature of nitration, the smaller is the maximum size of particles which can be satisfactorily nitrated.

The suspension of carbohydrates in chlorhydrins or mixtures of chlorhydrins and polyhydric alcohols, may be prepared by means of a colloid mill or the carbohydrates may be ground in any manner and suspended by adding the solid particles to the liquid with agitation. In order to avoid quick settling of the carbohydrate particles and also in order to obtain good nitrating qualities with high proportions of carbohydrates under the conditions commonly employed in the nitration of various glycerin compositions now in use on a large scale, the size of the carbohydrate particles should be smaller than 100 mesh and preferably finer than 200 mesh.

I mix a quantity of carbohydrate particles, such as, for example, cane sugar, in a quantity of chlorhydrin or a mixture of polyhydric alcohols containing chlorhydrins, such as, for example, ethylene chlorhydrin, glycerol chlorhydrin or a mixture of these with glycols, glycerin or polymerized glycerin or in a quantity of polyhydric alcohol containing dissolved carbohydrates, such as, for example, solutions of cane sugar, glucose, fructose, etc. The mixture is then subjected to the action of a mixture of sulfuric and nitric acids. If, for example, the sugar particles are small enough to pass through 200 mesh screen and the proportion of sugar does not exceed approximately 50% of the total weight of the mixture, the nitration may be satisfactorily carried out at a temperature of approximately 50° F. With smaller particles or higher nitrating temperatures, suspensions containing more than 50% sugar can be satisfactorily nitrated. After all the suspension has been added to the mixed acid, the temperature may be lowered to about 35° F. The nitrated product is then allowed to separate in the usual way. It is then drawn off and washed with fresh water, soda water and salt water. When neutral a stabilizer, such as for example diphenylamine, may be added. In this case the nitration, purification, and stabilization are essentially the same as for 80-20 glycerin-sugar solutions. Additional washes, purification, and stabilization may be used, if desired.

In carrying out my process, the proportions of carbohydrates and polyhydric alcohols may, if desired, be as follows:

30% to 50% sucrose
70% to 50% monochlorhydrin

30% to 50% sucrose
20% to 45% monochlorhydrin
50% to 5% glycerin

While I have described my invention and given detailed and specific examples, I do not limit myself to the carbohydrates, chlorhydrins, and polyhydric alcohols mentioned herein nor to the size of particles or temperatures mentioned herein, but include within the scope of my invention the mixtures of high proportions of any carbohydrate particles with chlorhydrins or mixtures of chlorhydrins with any polyhydric alcohols for the purpose of producing liquid explosives, the viscosities of which are not higher than that obtained by nitrating 20 parts of cane sugar in 80 parts of glycerin.

I claim:

1. A process of manufacturing an explosive containing a nitrated sugar, comprising forming a suspension of 25% to 50% sugar in a chlorhydrin containing mixture, said mixture having a viscosity less than glycerin, and nitrating the suspension.

2. A process of manufacturing an explosive containing a nitrated sugar, comprising forming a suspension of 25% to 50% sugar in a mixture of chlorhydrins and polyhydric alcohols, said mixture having a viscosity less than glycerin, and nitrating the suspension.

3. A process of manufacturing an explosive containing a nitrated sugar, comprising forming a suspension of 25% to 50% sugar in a chlorhydrin having a viscosity less than glycerin and nitrating the suspension.

4. Invention of claim 3 in which the chlorhydrin is glycerol monochlorhydrin.

5. A process of manufacturing an explosive containing a nitrated sugar, comprising forming a suspension of 25% to 50% sugar in a mixture of glycerin and glycerol chlorhydrin and nitrating the suspension.

6. Invention of claim 5 in which the sugar is sucrose.

7. A process of manufacturing an explosive containing a nitrated sugar, comprising forming in a chlorhydrin a suspension of 25% to 50% sugar in the form of particles of a fineness sufficient to pass through a 100 mesh screen, and nitrating the suspension.

8. A process of manufacturing an explosive containing a nitrated sugar, comprising forming in a chlorhydrin a suspension of 25% to 50% sugar in the form of particles of a fineness sufficient to pass through a 200 mesh screen, and nitrating the suspension.

9. A process of manufacturing an explosive containing a nitrated sugar, comprising forming in a chlorhydrin a suspension of 25% to 50% sugar in the form of particles of a fineness sufficient to pass through a 100 mesh screen, and nitrating at about 50° F.

10. A process of manufacturing an explosive containing a nitrated sugar, comprising forming in a chlorhydrin medium having a viscosity less than glycerin, a suspension of 25% to 50% sugar having a fineness sufficient to pass through a 100 mesh to 250 mesh screen, nitrating the suspension, and controlling the temperature of nitration in relation to the said fineness and percent of carbohydrate substantially as described.

In testimony whereof, I affix my signature.

PHILIP G. WRIGHTSMAN.